United States Patent
Bailly et al.

[11] Patent Number: 5,921,362
[45] Date of Patent: Jul. 13, 1999

[54] SYNCHRONIZING DEVICE WITH SPRING ELEMENT APPLYING CONSTANT FORCE TO A DISC SET FOR ACHIEVING THE SYNCHRONIZATION MOMENT

[75] Inventors: Gerhard Bailly; Detlef Baasch, both of Friedrichshafen; Gerold Bieber, Langenargen; Unal Gazyakan, Friedrichshafen, all of Germany

[73] Assignee: ZF Friedrichshafen AG, Friedrichshafen, Germany

[21] Appl. No.: 08/894,424

[22] PCT Filed: Feb. 22, 1996

[86] PCT No.: PCT/EP96/00728

§ 371 Date: Aug. 19, 1997

§ 102(e) Date: Aug. 19, 1997

[87] PCT Pub. No.: WO96/27090

PCT Pub. Date: Sep. 6, 1996

[30] Foreign Application Priority Data

Feb. 28, 1995 [DE] Germany ............... 195 06 987

[51] Int. Cl.⁶ ................................................. F16D 23/06
[52] U.S. Cl. .................. 192/53.32; 192/53.3; 74/339
[58] Field of Search .................... 192/53.32, 53.35, 192/53.3, 70.14, 107 M; 74/339

[56] References Cited

U.S. PATENT DOCUMENTS

| | | | |
|---|---|---|---|
| 1,777,012 | 9/1930 | Murray | 192/53.32 |
| 2,397,943 | 3/1942 | Bull | 192/53.32 |
| 2,467,987 | 4/1949 | Peterson et al. | 192/53.32 |
| 2,627,955 | 2/1953 | Perkins | 192/53.32 |
| 3,063,529 | 11/1962 | Cook | 192/53.5 |
| 3,543,897 | 12/1970 | Lemke | 192/53.32 |
| 4,131,185 | 12/1978 | Schall | 192/53.5 |
| 4,934,498 | 6/1990 | Knowles | 192/53.32 X |
| 5,048,654 | 9/1991 | Yesnik | 192/70.14 |
| 5,452,784 | 9/1995 | Miyoshi et al. | 192/70.14 X |
| 5,613,587 | 3/1997 | Baxter, Jr. | 192/53.32 |

FOREIGN PATENT DOCUMENTS 30 35 045 A1 3/1982 Germany.
32 08 945 A1 9/1983 Germany.

OTHER PUBLICATIONS

"ZF–B–Sperrsynchronisierung", Pub. No. R 2964–367, Mar. 1967, No translation provided ap Sep. 25, 1998.

*Primary Examiner*—Charles A. Marmor
*Assistant Examiner*—Ankur Parekh
*Attorney, Agent, or Firm*—Davis and Bujold

[57] ABSTRACT

A synchronizing device (2) is proposed for torque-transmitting connection of two rotary parts of a shift transmission, in particular for connecting a transmission shaft (4) with gearwheel (6, 8) rotatably supported on the transmission shaft (4). A synchronizer sleeve (30) has an outer disc carrier (36) connected with a gearshift device (64) and an inner disc carrier (34). A set of discs (40) is provided between the disc carriers (34, 36). The adjacent discs of the set of discs (40) are alternatively connected either with the inner disc carrier (34) or with the outer disc carrier (36). When the speed of rotation of the outer disc carrier (36) differs from that of the inner disc carrier (34), the discs allow a synchronization moment. For that purpose the outer disc carrier (36) has a device (62) for form-fittingly connecting the outer disc carrier (36) with a device (60, 76) on the gearwheel (6, 8). After an axial displacement of the outer disc carrier (36) in direction to the gearwheel (6, 8) to be engaged, form locking is achieved before the torque-transmitting coupling teeth (24, 26, 32) between the inner disc carrier (34) and the gearwheel (6, 8) engage each other. The inner disc carrier (34) is permanently non-rotatably connected with the transmission shaft (4) and a spring element (42) is provided which is capable of constantly exerting a force on the disc set (40) for achieving a synchronization moment. The friction discs preferably have paper linings. The form-locking devices and the coupling teeth may be spring-mounted and have blunt ends.

17 Claims, 2 Drawing Sheets

SYNCHRONIZING DEVICE WITH SPRING ELEMENT APPLYING CONSTANT FORCE TO A DISC SET FOR ACHIEVING THE SYNCHRONIZATION MOMENT

BACKGROUND OF THE INVENTION

For transmitting the input power and adapting the engine torque to the traction a vehicle needs, there are practically only used today multi-stage gearwheel transmissions.

The transmission control can be considerably simplified by means of a synchronizing device. In the synchronization, the speed adaptation of the transmission elements to be interconnected is carried out automatically or controlled in order to prevent the double clutch when upshifting or the double clutch with intermediate blipping of the throttle when downshifting. The security in traveling is clearly improved, since even in critical traveling situations, it is possible to change gears quickly, reliably and also noiselessly, the driver's right foot, for example, can remain on the brake while downshifting when traveling downhill.

A synchronizer device has to perform the following tasks:
a speed adaptation of two transmission elements and parts connected therewith rotating at different speeds so that they can be form-fittingly interconnected without grating noise;
locking of the form-fitting connection until synchronous speed of the transmission elements to be connected in order to prevent grating noises and damages of the form-fitting gearshift elements;
release of the locking at the moment of the synchronous speed;
speed adaptation within the shortest time and with as low as possible gearshift forces;
security of operation even under unfavorable circumstances such as when the transmission oil is cold, viscous or under extremely quick breaking of the gears.

The synchronized vehicle transmissions existing today, mostly use synchronizer devices for each individual gear.

The locking synchronization with conical adapter has become widespread. In this system are used conical friction cones for the force-locking speed adaptation of the transmission elements to be connected. This kind of synchronization is used both in passenger cars and in commercial vehicles.

Gearwheel and accessory clutch bodies are firmly interconnected. The clutch body has one friction cone and carries outside the selector teeth. The synchronizer sleeve is non-rotatably, but axially movably situated upon the synchronizer body, which sits firmly on the main shaft of the transmission. Each recess of the synchronizing body has a compression spring, a ball pin and a pressure piece. In the central position of the synchronizer sleeve, the springs press the ball pins through a bore in the pressure piece into a V-shaped recess of the synchronizer sleeve. Between the clutch and synchronizing bodies is situated the synchronizing ring which can perform relative to the synchronizing body a rotary motion limited by stops. The synchronizing ring likewise has a friction cone and carries on the external diameter the so-called locking teeth.

In idle, the synchronizer sleeve is in an axial central position. The gearwheels can freely rotate upon the transmission main shaft. Due to axial movement of the synchronizer sleeve, the synchronizing ring is pressed by means of ball pins and pressure pieces against the friction cone of the clutch body. Due to the speed difference of the parts to be coupled, the synchronizing ring is turned around the synchronizer sleeve as far as the stop. In this position, the locking teeth prevent the further axial movement of the synchronizer sleeve.

The axial gearshift force exerted on the synchronizer sleeve is transmitted, via the beveled teeth, to the friction cones of the synchronizing ring and the clutch body, reinforced on the friction cone, transformed to a torque and thus effects a reduction of the speed difference which becomes quicker as the gearshift force becomes stronger and thus synchronizing the torque. The chamfering angle of the locking teeth is designed so that the torque produced on the synchronizing ring, by means of the gearshift force of the synchronizer sleeve, is less than the friction torque acting opposite thereto on the cone. After achieving the synchronous speed, the synchronizing ring is turned back by the restraining gearshift pressure of the synchronizer sleeve until the teeth of the synchronizer sleeve stand before the tooth gaps of the synchronizing ring and a passage through the locking teeth for noiseless engagement of the gear is possible.

Such a locking synchronizing device has been disclosed, for example, in "ZF-B-Sperrsynchronisierung"/publication 42290/R 2964-367 of March 1967.

The locking synchronizing device described in said publication is designed so that when the clutch body is pressed on the friction cone, the synchronizing ring, provided with outer teeth, performs a rotary motion limited by the stops on the synchronizing body. The consequence of said rotation is that the beveled front faces of the teeth of the synchronizing ring press against the synchronizer sleeve and thus prevent further movement of the sleeve. Only when the cone friction surfaces have contributed to the synchronous speed of the parts to be coupled does the restraining pressure of the synchronizer sleeve effect a turndown of the synchronizing ring. The lock is thus released and the synchronizer sleeve is pushed into the teeth of the clutch body.

During idling, the synchronizer sleeve is in an axial central position. The detent pins are pressed by springs into detents of the synchronizer sleeve. The idler wheels can freely rotate upon their shafts. The speed difference between synchronizing ring and clutch body and the drag torque between their friction faces cause the synchronizing ring to abut on the rotary stop of the synchronizing body. The beveled tooth faces of the synchronizer sleeve and synchronizing ring are opposite each other.

In the locking position, the synchronizer sleeve has first moved the synchronizing ring against the clutch body by the detent pins and pressure pieces. The tooth faces have thus assumed the further guidance of the gearshift force from the synchronizer sleeve directly to the synchronizing ring. As long as a speed difference exists between the synchronizing ring and clutch body, the friction torque on the cone friction faces of synchronizing ring and clutch body is stronger than the restoring torque through the beveled tooth faces. The synchronizer sleeve is, therefore, locked against cutting into the clutch body.

Only when the speed difference between synchronizing ring and clutch body has been adjusted and the friction torque thus removed does the synchronizer sleeve move the synchronizing ring back to the position of "tooth upon tooth gaps". Over the locking teeth of the synchronizer ring, the synchronizer sleeve is then inserted into the teeth, likewise beveled on the front side, of the clutch body.

This known synchronizing device needs considerable improvement as to operation and cost of production. Improvement is also needed in the strong gearshift force required in low gear steps and the unsatisfactory shifting feel which makes itself noticeable in a certain jam during the gearshift operation, an unsatisfactory unlocking inhibition and force peaks when meshing. Force peaks occur after synchronization, generally designated as "2nd point", which are caused by the buildup of a differential speed in the free flight phase or an impact incident when the teeth impinge upon each other combined with a great inertia moment. They act as accelerations on the gear-shift lever. The synchronizing device of known design also requires large space. Existing demand for reductions, low weight and high complexity are not satisfied by it.

The customary synchronizing devices have at their disposal the three basic functions of synchronization connections that can be closed and dissolved as often as desired of two parts rotating on a common axis, transmission of energy to, or removal of energy from, a rotating part (acceleration, braking), adjustment of speed difference between two parts rotating on a common axis to a value equal to or approximate to zero.

Examining a gearshift operation of the known synchronizing device with regard to the negative influences on the shifting feel, the phases after achieving the synchronous speed are especially conspicuous.

The locking position can only be canceled by exerting force on the gearshift lever turning the free rotating masses by one half tooth pitch of the coupling teeth. The synchronizing ring is designed to lock and secure by the selection of tapering angle and geometry of the locking teeth. Against the unlocking torque abutting on the locking teeth, an equally strong reaction torque of the inert rotary mass acts via the friction cone, thus preventing a separate rotation of the ring relative to the free rotary masses. It is only in the "free flight phase" between unlocking and impinging of the coupling teeth that the synchronizing ring should have released itself from the friction cone. An adherence during meshing of the coupling teeth would cause a breaking up of the ring and therewith additional need of force.

Disadvantages result during high drag torques on the free rotary masses of the transmission due to the lack of torque transmission in the "free flight phase". During the short interval of time without torque transmission between the rotary masses to be coupled, a speed difference again builds up. Accordingly, hard percussive and therewith rejection forces make themselves unpleasantly noticeable when the coupling teeth impinge on each other in the gearshift lever. This problem becomes more acute in the synchronizing devices used today due to the requirement determined by construction of keeping at least the gradient angles on the locking and meshing teeth at equal values.

In synchronizing devices with friction discs, the conical friction members are replaced by a number of discs which rub against each other during the speed adaptation. Here discs axially adjacent to each other in sequence are connected either on one side with the synchronizing ring or the transmission shaft, or on the other side, with the clutch body or the gearwheel itself. Such a synchronization device which, for example, can be equipped with a reinforcing device of the synchronization force, has been disclosed in DE 32 08 945.

From U.S. Pat. No. 1,777,012 is also known a synchronizing device having friction discs. An axially movable element for connecting a transmission shaft with a gearwheel consists of an outer disc carrier with teeth and an inner disc carrier with coupling teeth. Between both annular disc carriers are situated friction discs which are each axially consecutively connected with both disc carriers. Each disc carrier supports a set of friction discs. The friction discs are adjacent to each other without being pressed together by a predetermined force. Only by the gearshift force introduced by the driver, which at first axially moves only the first disc carrier with its set of friction discs, are the two sets of friction discs pressed against each other. The inner disc carrier has on its axially opposite ends clutch dogs which engage in the teeth of the gearwheel to be shifted. The inner disc carrier likewise has internal teeth with which it can be axially moved on the shaft between the teeth. The outer disc carrier has gripping teeth which project axially farther than the coupling teeth on the inner disc carrier so that the outer disc carrier reaches the gearwheel sooner. The sets of friction discs are situated between the two disc carriers in a manner such that on one side the outer disc abuts on stops and the outer disc on the other side is secured by stop rings. In the disengaged state, the inner disc carrier lies with an annular spring in an area without teeth upon the transmission shaft. If the disc carriers are axially moved away from the neutral position by a gearshift fork, this movement transmits itself from the outer disc carrier in which the gearshift fork meshes, via the disc sets, to the inner disc carrier. The inner disc carrier can first move along unhindered, but then the annular spring runs up on facets of the teeth to the transmission shaft where it generates a friction which prevents the axial movement. The friction between the disc sets is thereby reinforced and the adaptation of speed is achieved.

The disadvantage here is that to produce the synchronous moment, the adjacent gearshift force is required. Without the adjacent gearshift force and the friction produced by the axial movement between annular spring and dogs, no synchronous moment is generated between the friction discs. Neither the gripping teeth nor the coupling teeth are spring mounted here.

SUMMARY OF THE INVENTION

Departing from the prior art, the problem to be solved by this invention is to provide a synchronizing device which produces a high synchronous moment requiring low gearshift force and avoiding engagement jerks and gearshift noises.

The synchronizing device according to the invention has coupling teeth which are spring-mounted relative to the gearwheel to be engaged. For this purpose there are provided, for example, between the synchronizing body and the gearwheel, clutch bodies in the shape of clutch discs which can mesh with inner teeth the corresponding outer teeth on the gearwheel or on the transmission shaft. The clutch bodies are limitedly axially movable, the synchronizing body, on one hand, and a spring device, such as a corrugated spring situated between clutch body and gearwheel, on the other hand, forming axial limitations. The clutch body is axially movable in a maximum direction toward the gearwheel until the corrugated spring lies flat between the clutch body and gearwheel. The clutch bodies have a mass as small as possible. The synchronizing device contains a disc set which is provided in common for both gearwheels to be engaged. The disc set is provided between two parts of a synchronizer sleeve so as to be axially offset under prestress by a spring device, such as a plate spring. Other spring devices, such as spring rings, toothed discs, fan discs, clamping plates, and discs or rings made of rubber or rubber-like materials, can also ensure, by adequate design, a very finely dosed prestress. The prestress can also be obtained by a spring device which results from the configuration of the friction discs. Thus one can use friction discs which are designed in the shape of corrugated springs in the unstressed state and when installed are compressed together in such a manner that the compressed disc set has flat or almost flat discs, the prestress resulting from the restoration to the original shape. By selection of shape and material, it is possible to obtain finely dosed control upon the prestress. The effect of said prestress is that the disc set, when the synchronizing device is unengaged, rotates without friction of the individual discs on each other together with the synchronizing body and the transmission shaft upon which the synchronizing device is mounted.

The synchronizer sleeve has radially outer gripping teeth which correspond to gripping teeth on the gearwheels to be engaged. The gripping teeth on the gearwheels can be provided on separate parts which can be spring-mounted relative to the gearwheel and are connected with the gearwheels, for example, by teeth. Due to the arrangement of the gripping teeth in separate parts on the gearwheels, the mass of the gripping teeth can be kept small.

In addition, the synchronizer sleeve has radially inner coupling teeth. On this place, the coupling teeth have in an axial direction less width than on the area of the gripping teeth so that the gripping teeth on the synchronizer sleeve can connect with the gripping teeth on the gearwheels sooner than the coupling teeth of the synchronizer sleeve and clutch body.

The gripping teeth and coupling teeth can be spring-mounted by spring devices like corrugated springs, plate springs, spring rings, gear discs, fan discs, clamping discs and discs or rings made of rubber or rubber-like materials.

BRIEF DESCRIPTION OF THE DRAWINGS

The invention is described in detail with the aid of figures. In the drawings.

DESCRIPTION OF THE PREFERRED EMBODIMENTS

Figure 1:
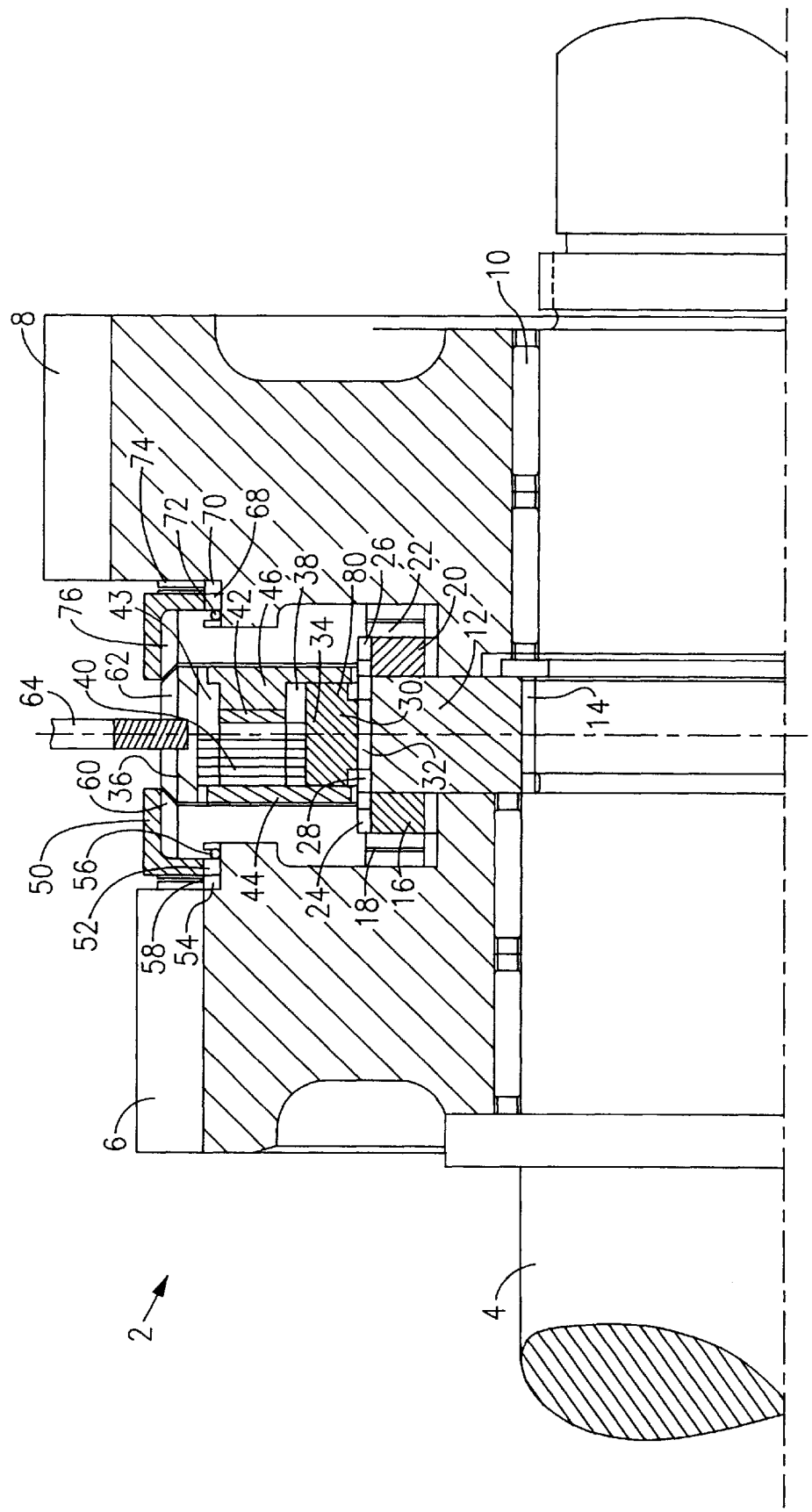
FIG. 1 is a representation of the synchronizing device in section.

FIG. 1 is the representation of the synchronizing device 2 according to the invention. Upon a transmission shaft 4 are situated two gearwheels 6 and 8 axially firm, but freely rotatable. For this purpose, the gearwheels 6 and 8 are mounted on supports such as needle bearings 10 so that they can rotate as frictionlessly as possible around the transmission shaft 4. Between the gearwheels 6 and 8, a synchronizing body 12 is situated upon the transmission shaft 4, and is non-rotatably connected with the transmission shaft 4 preferably by teeth 14. Between the synchronizing body 12 and the gearwheel 6 are provided a clutch body 16 and a spring device 18. The spring device 18 is designed, for example, as corrugated spring and cushions the clutch body 16 in direction toward the synchronizing body 12. Between the synchronizing body 12 and the gearwheel 8, a clutch body 20 and a spring device 22 are provided. The spring device 22 is likewise designed, for example, as corrugated spring and cushions the clutch body 20 in direction toward the synchronizing body 12. The clutch body 16 has as outer teeth, coupling teeth 24. The clutch body 20 likewise has as outer teeth coupling teeth 26. The synchronizing body 12 has outer teeth 28 in which the synchronizer sleeve 30 meshes with inner teeth. With its inner teeth, the synchronizer sleeve 30 is axially movable in the outer teeth 28. The inner teeth of the synchronizer sleeve 30 act as coupling teeth 32, together with the coupling teeth 24 and 26 on the clutch bodies 16 and 20. The coupling teeth 24, 26, 32 can be designed blunt, that is, without points. The ends of the coupling teeth 24, 26, 32 can be provided on the corners with flash bevels, which make it possible to prevent a gearshift at inadmissibly high speeds. A relief rolling of the coupling teeth 24, 26, 32 has also proved advantageous, since there is obtained a self-locking connection between the coupling teeth 32 of synchronizing sleeve 30 and clutch body 16, 20 which prevents an undesired tripping of the gears. In addition, the synchronizer sleeve 30 has on its outer periphery outer teeth, which are shaped as gripping teeth 62, as explained in more detail in FIG. 2. In the outer periphery is a groove which can advantageously mesh a gearshift fork 64 of a gearshift device.

The synchronizer sleeve 30 has an inner disc carrier 34 and an outer disc carrier 36. The disc carrier 34 meshes, for example, with outer teeth 38, in corresponding teeth on separate discs of a disc set 40. The disc carrier 36 meshes for its part, for example, with inner teeth 43 likewise in corresponding teeth on other discs of the disc set 40. One disc, which is connected with the disc carrier 34 here, follows in axial sequence a disc, which is connected with the disc carrier 36, whereby during a rotation of the disc carriers 34 and 36 relative to each other, the discs of the disc set 40 rub against each other. The frictional surface of the discs preferably consists of paper, but other materials of good frictional properties can be used, such as molybdenum friction linings or sintered frictions linings. To obtain a small axial extension of the synchronizer sleeve, the number of discs must be limited, for example, to three discs for each disc carrier 34 and 36. The disc set 40 is put under a defined prestress in axial direction, by a spring device, such as a plate spring 42, the disc set 40 is pressed by the plate spring 42 against a first part 44 connected with the inner disc carrier 34. On the other side, the plate spring 42 abuts on a second part 46 and supports itself axially in relation thereto. The second part 46 is likewise connected with the inner disc carrier 34, for example, in the form of a rivet 80 diagrammatically shown here. Screw connections or arrangements with pins and safety rings can also be used. The parts 44 and 46, which can be designed in the form of metal plates, for example, are freely rotatable relative to the outer disc carrier 36. On the gearwheel 6 is a gripping device 50, which is non-rotatably connected with the gearwheel 6, via inner teeth 52, with outer teeth 54 on the gearwheel 6. In the outer teeth 54, the gripping device 50 is axially movable with limitation with its inner teeth 52. The gripping device 50 is axially limited on one side by a stop on the gearwheel 6 and on the other side by a safety device, such as a guard ring 56. Between the gripping device 50 and the stop on the gearwheel 6 can be provided a spring device such as a corrugated spring 58 by which the gripping device 50 is axially spring mounted relative to the synchronizer sleeve 30. The gripping device 50 has gripping teeth 60, explained in more detail in FIG. 2, which are oriented in axial direction toward the synchronizer sleeve 30. The gripping device 60 is capable of meshing in the gripping teeth 62 on the synchronizer sleeve 30.

On the gearwheel 8 is a gripping device 66, which is non-rotatably connected by inner teeth 68 with outer teeth 70 on the gearwheel 8. In the outer teeth 70, the gripping device 66 with its inner teeth 68 is axially movable with limitation. At the same time, the gripping device 66 is axially limited on one side by a stop on the gearwheel 8 and on the other side by a safety device such as a guard ring 72. Between gripping device 66 and stop on the gearwheel 8, there is a spring device, such as a corrugated spring 74, by which the gripping device 66 is axially spring-mounted relative to the synchronizer sleeve 30. The gripping device 64, explained in more detail in FIG. 2, has gripping teeth 76 axially oriented in direction to the synchronizer sleeve 30. The gripping teeth 76 are suited to mesh in the gripping teeth 62 on the synchronizer sleeve 30.

The disc carriers 34 and 36 with the disc set 40, the same as the parts 44 and 46 and the plate spring 42, form a jointly axially movable homogeneous gearshift set. To move the gearshift set, an actuating element, such as the gearshift fork 64, meshes in a recess revolving outside in the outer disc carrier 36 of the synchronizer sleeve 30.

If one of the loosely rotating gearwheels 6 or 8 is connected with the transmission shaft 4 moving at different speed, the homogeneous gearshift set is displaced in direction to the gearwheel to be engaged. Due to the displacement, the outer disc carrier 36 comes into contact with the gripping device 50. The gripping device 50 spring-mounted by the corrugated spring 58 can axially give way to the disc carrier 36. In areas where disc carrier 36 and gripping device 50 touch, both parts have gripping teeth 60, 62. Due to the small mass of the gripping device 50 and under the axially acting spring tension of the corrugated spring 58, the gripping device 50, with the gripping teeth 60, will mesh at the adequate moment, that is, when passing a tooth gap in the gripping teeth 62, on the disc carrier 36. By virtue of the meshing the gripping device 50 can transmit a rotation torque from the outer disc carrier 36 to the gearwheel 6 or vice versa. If said torque exceeds a limiting value adjustable by the number of discs and design of the plate spring or stress of the plate spring, the disc set begins to slip. The use of paper discs is here convenient, since the difference between static friction and sliding friction can be kept small.

The cause of the torque that turns the friction discs against each other is the existing speed difference between the gearwheel 6, the idle rotary masses connected therewith and the transmission shaft 4. A dynamic shock incident due to the sudden acceleration of the inert rotary masses is prevented by the disc clutch and limits itself to the abrupt acceleration of the outer disc carrier 36 and the friction discs associated therewith. By the construction according to the invention, it is possible to keep very small said inert masses. The rotation energy contained in the freely rotating inert masses when braking, or the absence of energy when accelerating, is transmitted by the slipping clutch. In this synchronization phase, the slipping clutch assumes the function of speed adaptation. In this synchronization phase, the whole gearshift set is moved further in direction toward to gearwheel 6. The gearshift set is guided into the teeth 28, 32 between inner disc carrier 30 and synchronizing body 12. After a defined travel, the coupling teeth 32 of the inner disc carrier 30 come into contact with the outer coupling teeth 24 on the clutch body 16. The clutch body 16, as result of being spring-mounted by the corrugated spring 18, can axially give way to the inner disc carrier 30.

In coupling teeth 24, 32 designed with blunt ends, the blunt faces are probably under prestress of the spring. If, incidentally, a meshing has already occurred, the gearshift operation is altogether terminated. Otherwise, in the state of stressed consecutive position of the teeth, the vehicle clutch is closed and the torque that builds up turns the teeth against each other. The teeth mesh and the gearshift is terminated. A premature turning of the teeth against each other and the subsequent meshing are possible also by drag torques on the wheel set of the transmission.

For example, if the gearshift is not manually carried out by the driver per gearshift linkage, the alternative of an automatic gearshift by gearshift means remotely controlled by the driver is also possible. The remote control is possible here also by intercalating a logical control which acts upon the shiftable gear steps. An automatic transmission can also take over the whole gearshift of the transmission without influence by the driver, the gearshift being preferably always to the optimal ranges.

Pneumatically or electrically actuated gearshift means are mainly used as gearshift means. Hydraulically actuated gearshift means can also be used.

By eliminating the meshing bevels on the coupling teeth, it is possible to obtain a shorter shift stroke. This benefit can be used to increase the ratio between gearshift lever and synchronizer sleeve. So the shift and selector strokes can be clearly reduced on the gearshift lever under weak gearshift forces.

The spring-mounted impingement of the coupling teeth of synchronizer sleeve and clutch body impart to the driver an improved shift feeling and makes possible high gearshift speeds.

In automated synchronizing devices with an engine guide where a synchronization of the transmission parts to be shifted is achieved by a grasp in the engine control, the proposed synchronizer device can be used with special advantage. Here a defined speed difference is always present. It is possible at the same time, particularly with great advantage in cost, to accomplish a reliable synchronization of the gear steps to be shifted. The torque-transmitting teeth have the least possible flank clearance.

Figure 2:
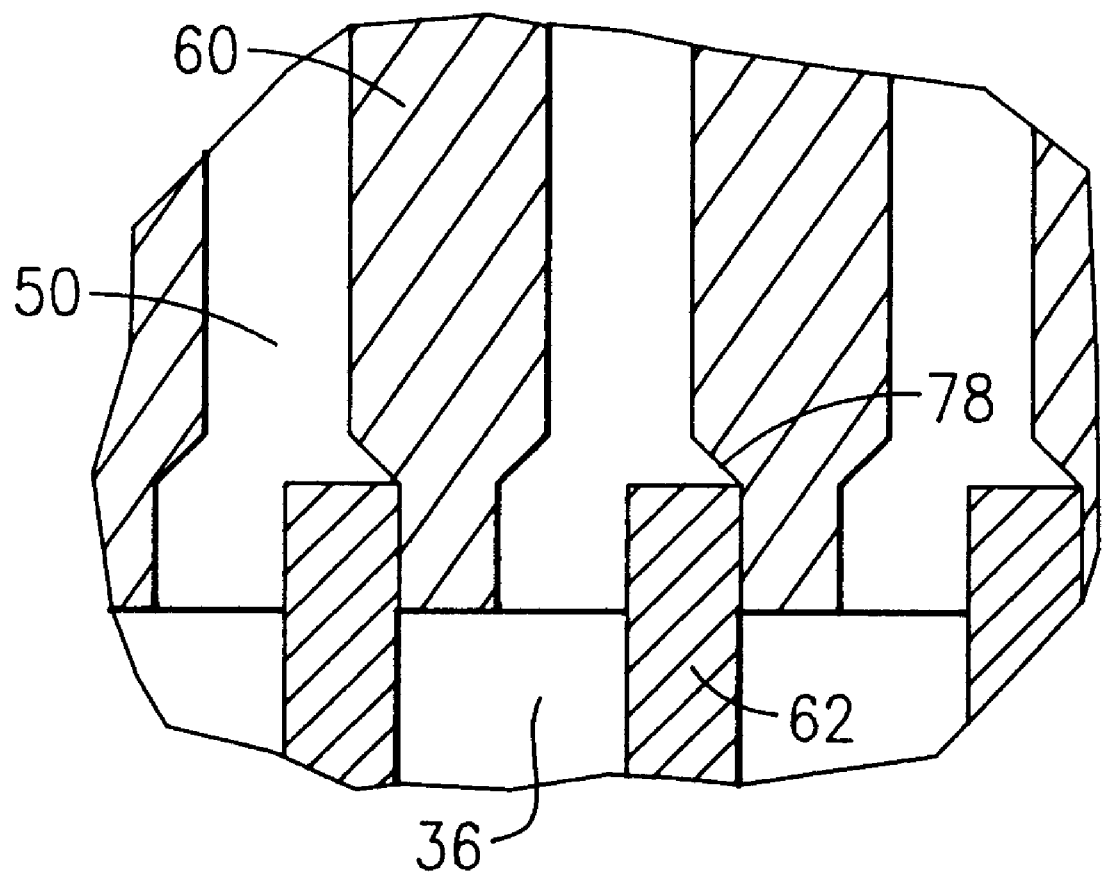
FIG. 2 is a segment of the gripping teeth.

A sufficiently long synchronization in the disc set 40 is needed before the coupling teeth 24, 26, 32 provided for torque transmission change the free rotary masses from the frictional engagement of the disc clutch to form locking of the coupling teeth to prevent a torque shock of inadmissible intensity. This can be achieved in different ways:

1. The time interval between the meshing of the gripping teeth 62 on the outer disc carrier 36 in the gripping teeth 60 or 76 on the gripping device 50 or 66 and impingement of the coupling teeth 32 on the inner disc carrier 34 on the coupling teeth 24 or 26 on the clutch body 16 or 20 is long enough to obtain a synchronous speed or a small admissible speed difference.
2. In FIG. 2 the gripping teeth 60 have on the gripping device 50 locking devices in the form of locking flanks 78 on which can abut the ends of the gripping teeth 62 of the outer disc carrier 36. An extension of the gripping teeth 62, 60 into each other under limited gearshift force is not possible until the synchronous speed is accomplished and the slipping torque between the discs in the disc set 40 is eliminated. After an unlocking operation, that is, after untwisting the free rotary masses, the whole gearshift set can be further moved and the coupling teeth impinge upon each other.
3. The gearshift set comes into contact with the coupling teeth 24 or 26 on the clutch body 16 or 20 at any speed difference. The tooth pairs of coupling teeth 24 or 26 and coupling teeth 32 on the inner disc carrier 34 are designed so that a throw back of the clutch body 16 or 20 takes place until falling below a maximum admissible speed difference for limiting a meshing stroke.

Solutions 1 and 3 are especially convenient for automatic transmission, since a control over the gearshift speed or the moment of closure of the main clutch is necessary. This can be achieved by an electronic control of the power train. In these solutions, a locking of the extension operation is omitted. In all solutions shown, the so-called free flight phase between removal of the locking function and non-rotatable connection of the coupling teeth does not occur. Thereby, it is possible to simultaneously actuate several synchronizing devices in one transmission.

Solution 2 is to be preferred in a design as a synchronizing device with manual operation, since an answer-back signal about the termination of the synchronizing process or the selection of an erroneous gear is delivered to the one who does the shifting. When using a manually operated device, the axial spring mounting of the gripping device 50, 66 in addition prevents an unpleasant bumper effect in the gearshift mechanism. The shiftable speed difference can be affected by the configuration of the gripping teeth 60, 76. A few teeth with great flank clearance allow meshing at high speed differences. In specific uses, it is also possible to omit spring-mounting of the gripping devices.

The smallest possible mass of gripping teeth and clutch bodies with a preferably spring-mounted arrangement provide a dynamically favorable gripping and meshing mechanism in order to achieve with the least wear of the teeth, a gripping of the gearwheels at high speed difference and a reliable meshing in the respective opposite teeth. A rotary elastic arrangement of the gripping teeth in a peripheral direction can constitute a further improvement in the damping behavior during meshing of the gripping teeth.

The gripping teeth can also be disposed on the gearwheels so as to be rotatable on the gearwheels when exceeding a high, defined preset friction torque. Said friction torque is stronger than the friction torque in the disc set. Due to the rotation, it is possible to dampen high impact peaks of the gripping teeth.

The use of friction discs with paper linings, which combine to form a set can be used jointly for two gear steps, and provides a cost advantage. They are, by far, more environmentally tolerable than, for example, discs with molybdenum coatings. An optimal solution in the kind of disc configuration is constituted by a disc having a static friction value lower than its sliding friction value.

The omission of a locking device likewise reduces the cost of the synchronizing device quite aside from the prevention of all locking problems that frequently appear.

Reference Numerals

| | |
|---|---|
| 2 synchronizing device | 42 plate spring |
| 4 transmission shaft | 43 inner teeth |
| 6 gearwheel | 44 part |
| 8 gearwheel | 46 part |
| 10 needle gearing | 50 gripping device |
| 12 synchronizing body | 52 inner teeth |
| 14 teeth | 54 outer teeth |
| 16 clutch body | 56 guard ring |
| 18 spring device | 58 corrugated spring |
| 20 clutch body | 60 gripping teeth |
| 22 spring device | 62 gripping teeth |
| 24 coupling teeth | 64 gearshift lever |
| 26 coupling teeth | 66 gripping device |
| 28 outer teeth | 68 inner teeth |
| 30 synchronizer sleeve | 70 outer teeth |
| 32 coupling teeth | 72 guard ring |
| 34 inner disc carrier | 74 corrugated spring |
| 36 outer disc carrier | 76 gripping teeth |
| 38 outer teeth | 78 locking flanks |
| 40 disc set | 80 riveting |

We claim:

1. A synchronizing device (2) for connecting a transmission shaft (4) to at least one gearwheel (6, 8) rotatably situated upon said transmission shaft (4), comprising: a synchronizer sleeve (30) where said synchronizer sleeve has an outer disc carrier (36) connected with a gearshift device (64) and an inner disc carrier (34) wherein between said inner disc carrier and said outer disc carrier (34, 36) lies a disc set (40) where adjacent discs connect with one of said inner disc carrier (34) and said outer disc carrier (36), such that when a speed difference exists between said outer disc carrier (36) and said inner disc carrier (34) a synchronous speed can be achieved between said disc set, said outer disc carrier (36) includes a device (62) for connection with a device (60, 76) on said at least one gearwheel (6, 8) after an axial displacement of said outer disc carrier (36) in direction toward said at least one gearwheel (6, 8), said connection being obtained before torque-transmitting coupling teeth (24, 26, 32) between the inner disc carrier (34) and said at least one gearwheel (6, 8) connect, said torque transmitting coupling teeth include coupling teeth on said synchronizer sleeve and coupling teeth on a clutch body, wherein said inner disc carrier (34) non-rotatably connects with said transmission shaft (4) and a spring element (42) applies a constant force upon said disc set (40) for achieving the synchronization moment when said disc set rotates.

2. A synchronizing device according to claim 1, wherein said synchronizing device (2) connects to an automated gearshift device.

3. A synchronizing device according to claim 1, wherein said device (60, 62, 76) for connection includes a locking device (78) which prevents impingement of said coupling teeth (24, 26, 32) when a speed difference above a preset value exists between said coupling teeth (32) on said synchronizer sleeve (30) and said coupling teeth (24, 26) on said clutch body (16, 20).

4. A synchronizing device according to claim 1, wherein a time difference between the impingement of said device (60, 62, 76) for connection and impingement of said coupling teeth (24, 26, 32) is preset, where if a speed difference above a preset value between said coupling teeth (32) on said synchronizer sleeve (30) and said coupling teeth (24, 26) on said clutch body (16, 20), impingement of said coupling teeth (24, 26, 32) is prevented.

5. A synchronizing device according to claim 1, wherein said coupling teeth (24, 26, 32) are designed for limiting a meshing stroke, so that when a speed difference above a preset value exists between said coupling teeth (32) on said synchronizer sleeve (30) and said coupling teeth (24, 26) on said clutch body (16, 20), a rejection operation of said coupling teeth (24, 26, 32) prevents an engagement into gear.

6. A synchronizing device according to claim 1, wherein said coupling teeth (24, 26, 32) have blunt ends.

7. A synchronizing device according to claim 1, wherein said coupling teeth (24, 26, 32) are axially spring-mounted by a spring element (18, 22).

8. A synchronizing device according to claim 1, wherein said device (60, 62, 76) for connection is non-rotatably disposed with teeth (52, 54, 68, 70) on said at least one gearwheel (6, 8).

9. A synchronizing device according to claim 1, wherein said device (60, 62, 76) for connection is rotatably situated on said at least one gearwheel (6, 8).

10. A synchronizing device according to claim 1, wherein said device (60, 62, 76) for connection is provided with blunt ends.

11. A synchronizing device according to claim 1, wherein said device (60, 62, 76) for connection is axially spring-mounted by a spring element (58, 74).

12. A synchronizing device according to claim 1, wherein said device (60, 62, 78) for connection is rotarily yieldably designed in a peripheral direction.

13. A synchronizing device according to claim 1, wherein said spring element (42) is a corrugated spring.

14. A synchronizing device according to claim 1, wherein said spring element (42) is a plate spring.

15. A synchronizing device according to claim 1, wherein said spring element, which is capable of applying a constant force upon said disc set (40), is a friction disc designed in the form of a corrugated spring.

16. A synchronizing device according to claim 1, wherein said disc set (40) consists of discs having paper linings.

17. A synchronizing device according to claim 1, wherein said disc set (40) consists of discs having linings of a static friction value lower than their sliding friction value.

* * * * *